United States Patent [19]

Sakamoto et al.

[11] Patent Number: 4,734,979

[45] Date of Patent: Apr. 5, 1988

[54] WEIGHTY OBJECT MOUNTING SYSTEMS

[75] Inventors: Shunji Sakamoto; Tuyoshi Watanabe, both of Higashihiroshima; Shigeo Okamizu, Hiroshima; Yukio Munenaga, Higashihiroshima, all of Japan

[73] Assignee: Mazda Motor Corporation, Japan

[21] Appl. No.: 945,961

[22] Filed: Dec. 24, 1986

[30] Foreign Application Priority Data

Dec. 25, 1985 [JP] Japan .............................. 60-295390
Jan. 17, 1986 [JP] Japan .............................. 61-8528
Jan. 17, 1986 [JP] Japan .............................. 61-5002[U]

[51] Int. Cl.$^4$ ............................................. B23P 19/00
[52] U.S. Cl. ...................................... 29/822; 29/430; 29/712; 29/714; 29/720; 29/824; 198/468.4; 414/590; 901/7
[58] Field of Search ............... 29/33 K, 430, 469, 703, 29/709, 711, 712, 714, 720, 791, 822, 823, 824; 414/590, 744 R; 901/7, 10, 46; 198/339.1, 409, 468.4

[56] References Cited

U.S. PATENT DOCUMENTS

| | | | |
|---|---|---|---|
| 4,589,184 | 5/1986 | Asano et al. | 29/714 |
| 4,589,199 | 5/1986 | Ohtake et al. | 901/46 |
| 4,627,158 | 12/1986 | Mitoh | 29/824 |
| 4,643,630 | 2/1987 | Shiiba et al. | 198/468.6 |

FOREIGN PATENT DOCUMENTS

5750181 5/1977 Japan .
5822387 8/1981 Japan .
58-206266 5/1983 Japan .

*Primary Examiner*—Mark Rosenbaum
*Assistant Examiner*—Frances Chin
*Attorney, Agent, or Firm*—Gerald J. Ferguson, Jr.; Michael P. Hoffman; Michael J. Foycik, Jr.

[57] ABSTRACT

A weighty object mounting system includes a mounting table provided in a mounting station established in an assembly line for supporting a weighty object placed thereon to be mounted on a transportable object transported into the mounting station, a lifting device for lifting the mounting table to move the weighty object thereon into a mounting position provided on the transportable object, a position adjusting device for shifting the position of the mounting table so as to compensate for misalignments arising between the transportable object and the weighty object, a mounting table releasing device operative to cause the position adjusting device to make the mounting table movable in a plane along the direction of transportation of the transportable object in the mounting station, and a positioning device attached to the mounting table and having a tapered portion provided for engaging with a receiving portion provided on the transportable object when the mounting table ascends. A sensor is also provided for detecting such a condition that the tapered portion of the positioning device comes into engagement with the receiving portion of the transportable object, and the mounting table releasing device is controlled by a controller to operative in response to a detection output from the sensor.

8 Claims, 8 Drawing Sheets

WEIGHTY OBJECT MOUNTING SYSTEMS

BACKGROUND OF THE INVENTION

1. Field of the Invention

The present invention relates generally to weighty object mounting systems, and more particularly, is directed to improvements in a weigty object mounting system for use in an assembly line wherein a weighty object such as an engine unit is mounted on a transportable object such as a vehicle body held by a moving support member and transported into a working station provided therein.

1. Description of the Prior Art

In a vehicle assembly line wherein a weighty object such as an engine unit or a suspension unit is mounted on a vehicle body, usually, the vehicle body is supported by a hanger engaged to be movable with a tact conveyer of the overhead type ard tact-transported into a mounting station. At the mounting station, a weighty object mounting system having a lifting table movable in the vertical, longitudinal and lateral directions, as disclosed in the Japanese patent application published before examination under publication No. 59-206266, is provided and the weighty object is placed on the lifting table. On the occasion of mounting actually, the weighty object is lifted by the lifting table to move into a mounting position on the vehicle body transported into the mounting station and thereat attached to the vehicle body with a plurality of bolts or the like.

Such mounting of the weighty object on the vehicle body in the vehicle assembly line proposed previously is achieved manually by workers and it is required of each worker to have an annoying control of tightening torque affecting the bolt for causing the weighty object to be fixed to the vehicle body. Accordingly, it is desired that the mounting of the weighty object on the vehicle body is conducted by automatized mechanical work without relying upon manual labour by a worker.

However, the vehicle body transported into the mounting station is usually accompanied with misalignments arising in relation to the weighty object placed on the lifting table due to, for example, unavoidable errors in size of each vehicle body and each hanger supporting the vehicle body or errors in position of the vehicle body supported by the hanger. Therefore, in the case of the mounting of the weighty object on the vehicle body intended to be conducted by automatized mechanical work, it is feared that the weighty object lifted by the lifting table is not moved appropriately into the mounting position on the vehicle body so as not to be properly attached to the vehicle dody with the bolts tightened by the automatized mechanical work.

In order to avoid such misalignments arising between the vehicle body transported into the mounting station and the weighty object placed on the lifting table in the mounting station, it is considered to detect the location of the vehicle body supported by the hanger and transported to the working station and to shift the lifting table accompanied with the weighty object in a plane along the direction of transportation of the vehicle body in response to a detection output of the location of the vehicle body so that the position of the weighty object corresponds properly to the location of the vehicle body. However, in such a case, since the location of the vehicle body supported by the hanger may be detected by an optical position sensor provided in a positioning station which is established to be adjacent to the mounting station at the upper course of the vehicle assembly line, it is also feared that the vehicle body supported by the hanger has a slight error in position thereof arising undesirably on a transporting path from the positioning station to the mounting station. In the case where the slight positional error of the vehicle body supported by the hanger thus brought about, for example, such a situation that the bolts, each of which is to be inserted into a couple of mounting holes provided respectively on the vehicle body and the weighty object and tightened for causing the weighty object to be fixed to the vehicle body, can not be inserted into the respective holes, may occur in the mounting station, and therefore the weighty object may not be properly attached to the vehicle body, even though the lifting table accompanied with the weighty object is shifted in the plane along the direction of transportation of the vehicle body in response to the detection output of the location of the vehicle body obtained at the positioning station.

OBJECTS AND SUMMARY OF THE INVENTION

Accordingly, it is an object of the present invention to provide a weighty object mounting system which avoids the foregoing problems encountered with the prior art.

Another object of the present invention is to provide a weighty object mounting system in which a mounting table is provided for supporting a weighty object placed thereon and moving the same into a mounting position on a transportable object which is held by a moving support member and transported into a mounting station to engage with the weighty object and the position of the mounting table in a plane along the direction of transportation of the transportable object is shifted by a position adjusting device so as to compensate for misalignments arising between the vehicle body and the weighty object in the mounting station, and by which the weighty object placed on the mounting table is engaged with the transportable object at the mounting position thereon to be properly attached to the same with automatized mechanical work even in the case where the transportable object transported into the mounting station is accompanied with minute errors in position thereof which are not compensated by shifting the position of the mounting table in the plane along the direction of transportation of the transportable object by means of the position adjusting device.

A further object of the present invention is to provide a weighty object mounting system in which a mounting table is provided for supporting a weighty object placed thereon and moving the same into a mounting position on a transportable object which is held by a moving support member and transported into a mounting station to engage with the weighty object and the position of the mounting table in a plane along the direction of transportation of the transportable object is shifted by a position adjusting device so as to compensate for misalignments arising between the vehicle body and the weighty object in the mounting station, and by which the weighty object placed on the mounting table is engaged with the transportable object at the mounting position thereon to be properly attached to the same with automatized mechanical work even in the case where the transportable object transported into the mounting station is accompanied with errors in position thereof including minute positional errors which are not compensated by shifting the position of the mounting table in the plane along the direction of transportation of the transportable object by means of the position adjusting device, a positional error in the direction of ascent and descent of the mounting table or positional errors resulting from being inclined to the moving support member.

A still further object of the present invention is to provide a weighty object mounting system in which a mounting table is provided for supporting a weighty object placed thereon and moving the same into a mounting position on a transportable object which is held by a moving support member and transported into a mounting station to engage with the weighty object and the position of the mounting table in a plane along the direction of transportation of the transportable object is shifted by a position adjusting device so as to compensate for misalignments arising between the vehicle body and the weighty object in the mounting station, and which is suitable for use in a vehicle assembly line for mounting an engine unit or suspension unit provided as the weighty object on a vehicle body provided as the transportable object.

According to the present invention, there is provided a weighty object mounting system for use in an assembly line comprising a mounting table provided in a mounting station established in the assembly line for supporting a weighty object placed thereon to be mounted on a transportable object which is held by a movable support member and transported into the mounting station, a lifting device for causing the mounting table to ascend for moving the weighty object placed thereon into a mounting position provided on the transportable object, a position adjusting device for shifting the position of the mounting table so as to compensate for misalignments arising between the transportable object and the weighty object in the mounting station, a mounting table releasing device provided with relation to the position adjusting device and operative to cause the position adjusting device to make the mounting table movable in a plane along the direction of transportation of the transportable object in the mounting station, a positioning device attached to the mounting table and having a tapered portion provided for engaging with a receiving portion provided on the transportable object when the mounting table ascends, a sensor for detecting a condition that the tapered portion of the positioning device comes into engagement with the receiving portion of the transportable object, and a controller operative to cause the mounting table releasing device to operate in response to a detection output from the sensor.

In one embodiment, the lifting device is operative further to cause the mounting table to have an additional ascent after the weighty object placed on the mounting table has been moved into the mounting position provided on the transportable object so as to have the transportable object lifted out of the moving support member.

In the weighty object mounting system thus constituted in accordance with the present invention, the position of the mounting table on which the weighty object is placed is adjusted in the plane along the direction of transportation of the transportable object by the position adjusting device in accordance with the actual position of the transportable object transported into the mounting station, so that errors in position of the transportable object to the weighty object placed on the mounting table in the mounting station are compensated. After that, when the condition that the tapered portion of the positioning device which ascends together with the mounting table comes into engagement with the receiving portion provided on the transportable object is detected by the sensor, the controller causes the mounting table releasing device to operate in response to the detection output obtained from the sensor. With the operation of the mounting table releasing device, the mounting table is made movable in the plane along the direction of transportation of the transportable object and shifted in position in response to an engaging condition between the tapered portion of the positioning device and the receiving portion provided on the transportable object. Consequently, even in the case where the transportable object transported into the mounting station is accompanied with minute errors in position thereof which are not compensated by shifting the position of the mounting table in the plane along the direction of transportation of the transportable object by means of the position adjusting device, such minute errors in position of the transportable object are substantially compensated appropriately and the weighty object placed on the mounting table is engaged properly with the transportable object at the mounting position thereon so as to be attached correctly to the same with automatized mechanical work.

Further, in the embodiment, the mounting table is caused to ascend additionally by the lifting device after the weighty object placed on the mounting table has been moved into the mounting position provided on the transportable object, so that the transportable object is lifted out of the moving support memoer. As a result of this, even in the case where the transportable object transported into the mounting station is accompanied also with a positional error in the direction of ascent and descent of the mounting table or positional errors resulting from being inclined to the moving support member, such positional errors of the transportable object are substantially compensated and the weighty object placed on the mounting table can be attached properly to the transportable object at the mounting portion provided thereon with automatized mechanical work.

The above, and other objects, features and advantages of the present invention will become apparent from the following detailed description which is to be read in conjunction with the accompanying drawings.

DESCRIPTION OF THE PREFERRED EMBODIMENTS

Now, embodiments of weighty object mounting system according to the present invention will be described in detail with reference to the accompanying drawings hereinafter.

Figure 1:
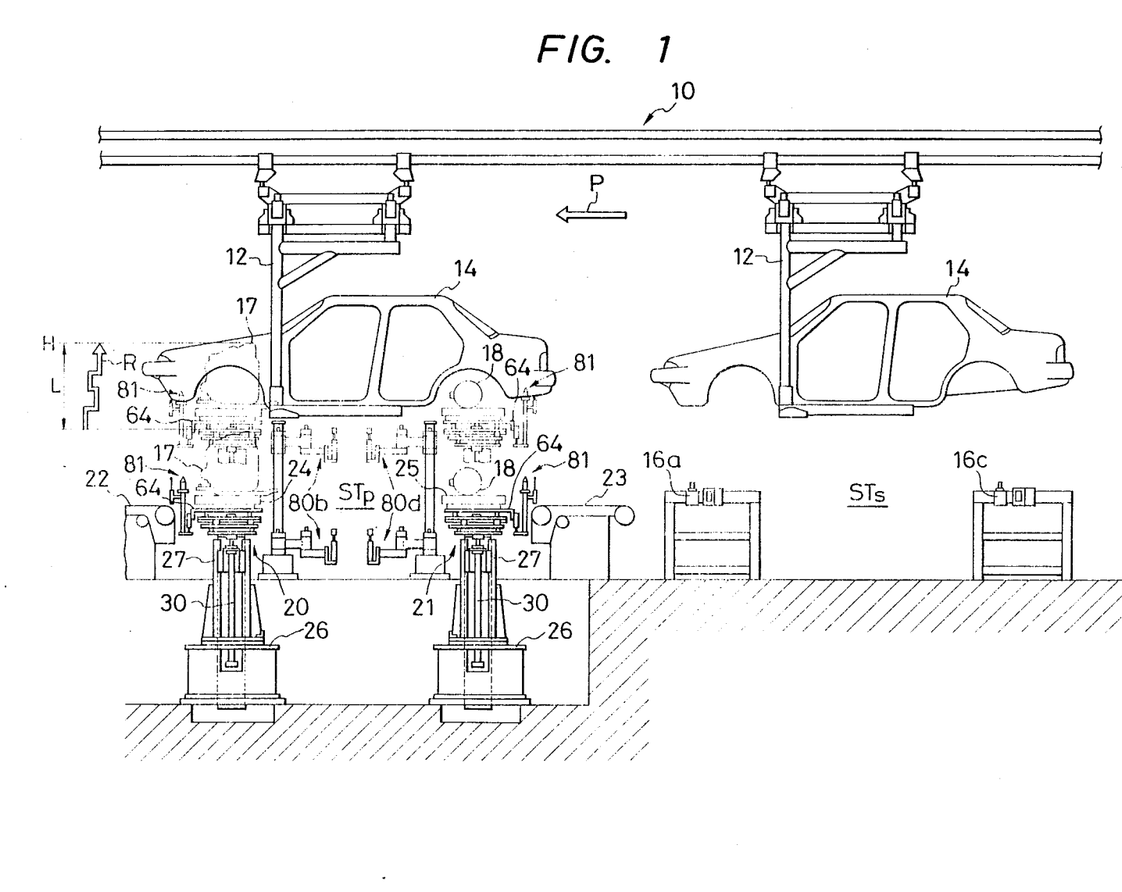
FIG. 1 is a schematic side view showing an embodiment of weighty object mounting system according to the present invention and a portion of a vehicle assembly line to which the embodiment is applied.
Figure 2:
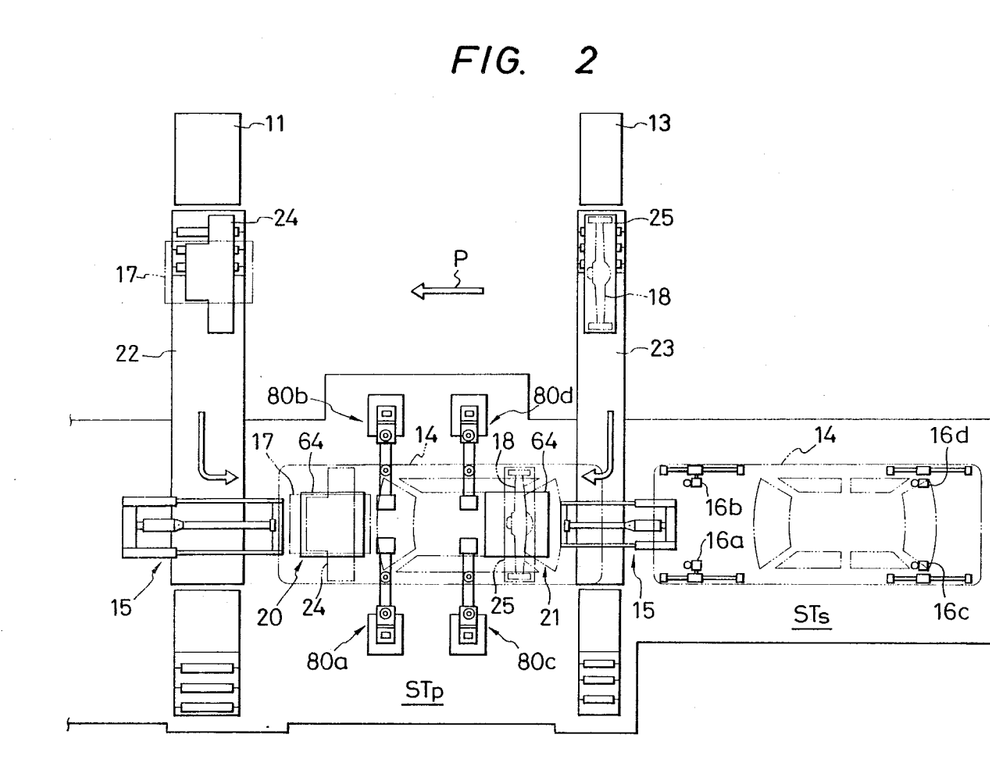
FIG. 2 is a schematic plane view showing the embodiment shown in FIG. 1 and a portion of the vehicle assembly line also shown in FIG. 1.

FIGS. 1 and 2 show schematically an example of the weighty object mounting system according to the present invention which is applied for mounting an engine unit and a rear axle unit on a vehicle body in a vehicle assembly line.

Referring to FIGS. 1 and 2, vehicle bodies 14 (transportable objects) which are supported by hangers 12 of a trolley conveyer 10 of the overhead type installed along a vehicle assembly line are tact-transported successively into a positioning station STs and a mounting station STp established at a couple of adjacent stop positions in the vehicle assembly line. In the positioning station STs, four optical position sensors 16a, 16b, 16c and 16d are provided for detecting the location of the vehicle body 14 transported thereinto and stopped thereat, and in the mounting station STp, a front lifter 20 for supporting an engine unit 17 (weighty object) and moving the same into an engine mounting portion provided on the vehicle body 14 and a rear lifter 21 for supporting a rear axle unit 18 (weighty object) and moving the same into a rear axle mounting position provided on the vehicle body 14 are provided independently. Further, in the mounting station STp, mounting robots 80a and 80b operative to fix the engine unit 17 to the vehicle body 14 at the engine mounting position provided thereon with bolts or nuts is provided in the vicinity of the front lifter 20, and mounting robots 80c and 80d operative to fix the rear axle unit 18 to the vehicle body 14 at the rear axle mounting position provided thereon with bolts or nuts is also provided in the vicinity of the rear lifter 21.

Each of the optical position sensors 16a, 16b, 16c and 16d is operative to pick up an image of a relatively small area on the vehicle body 14 including one of four holes provided at front and rear portiors of the vehicle body 14 to produce a positional information signal, and therefor is disposed at a position just below the corresponding one of the four holes provided on the vehicle body 14 under the situation where the vehicle body 14 is stopped correctly without errors in position thereof in the positioning station STs. A compact video camera constituted with a charge coupled device (CCD) may be used as each of the optical position sensors 16a, 16b, 16c and 16d. Since the positions of holes provided on vehicle bodies of different types are not coincident with each other, each of the optical position sensors 16a, 16b, 16c and 16d is arranged to be moved into a position corresponding to each of the vehicle bodies.

As shown clearly in FIG. 2, first and second conveying devices 22 and 23 are installed to elongate individually in the direction substantially perpendicular to the direction of transportation of the vehicle body 14 (indicated with an arrow P in FIGS. 1 and 2) and to enter into the front and rear portions of the mounting station STp, respectively. The first conveying device 22 conveys the engine unit 17 put on a pallet 24 from an engine unit supplying section 11 to a first predetermined location in front of the front lifter 20 in the mounting station STp, and the second conveying device 23 conveys the rear axle unit 18 put on a pallet 25 from a rear axle unit supplying section 13 to a second predetermined location behind the front lifter 20 in the mounting station STp. The engine unit 17 conveyed into the first predetermined location is placed on a rotary mounting table 64 provided at the top of the front lifter 20 together with the pallet 24 by a loading device 15 and the rear axle unit 18 conveyed into the second predetermined location is placed on a rotary mounting table 64 provided at the top of the rear lifter 21 together with the pallet 25 by another loading device 15. In such a situatior that the engine unit 17 and the rear axle unit 18 are placed respectively on the front and rear lifters 20 and 21, the engine unit 17 is secured at a predetermined position on the pallet 24 by a positioning member (not shown in the drawings) provided on the pallet 24 and the rear axle unit 18 is also secured at a predetermined position on the pallet 25 by a positioning member (not shown in the drawings) provided on the pallet 25. Further, the pallet 24 on which the engine unit 17 is secured is locked at a predetermined location on the rotary mounting table 64 of the front lifter 20 by a locking member (not shown in the drawings) provided on the front lifter 20 and the pallet 25 on which the rear axle unit 18 is secured is locked at a predetermined location on the rotary mounting table 64 of the rear lifter 21 by a locking member (not shown in the drawings) provided cn the rear lifter 21. Accordingly, the engine unit 17 is prevented from having positional shifts against the front lifter 20 and the axle unit 18 is also prevented from having positional shifts against the rear lifter 21.

Since each of the front and rear lifters 20 and 21 is of the same construction, only the front lifter 20 will be described hereinafter and the description of the rear lifter 21 will be omitted.

Figures 3, 4:
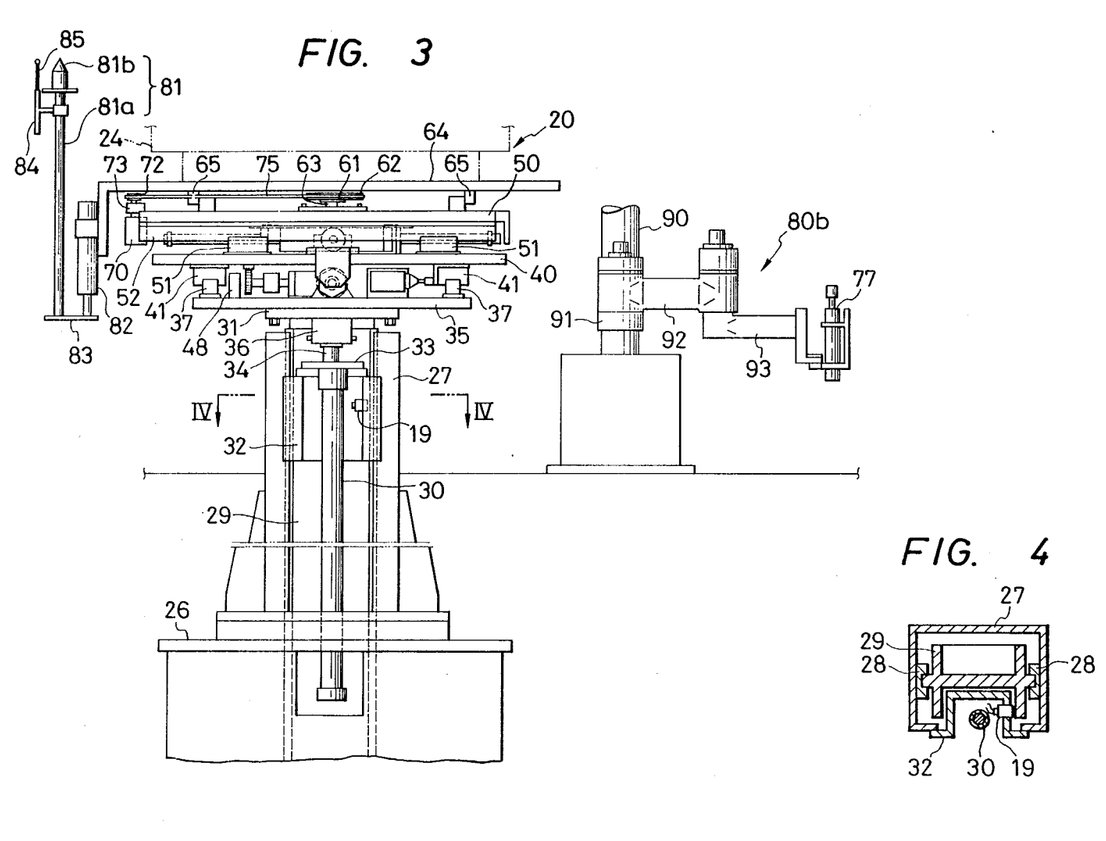
FIG. 3 is a schematic side view showing a lifter and a mounting robot used in the embodiment shown in FIG. 1.
FIG. 4 is a schematic cross-sectional view taken on line IV—IV of FIG. 3.

As shown in FIG. 3, the front lifter 20 has a base table 26 fixed on a floor at such a position as to be just below a portion of the vehicle body 14 forming an engine room when the vehicle body 14 transported into and stopped in the mounting station STp. On the base table 26, a fixed, support 27 having a cross-section in the shape of " ⊐ " as shown in FIG. 4 is planted. In the fixed support 27, a pair of guide rails 28 each elongating along the fixed support 27 are provided and a moving support 29 is engaged with the guide rails 28 to be slidable along the fixed support 27. The moving support 29 is longer than the fixed support 27 and provided with an end plate 31 fixed to the upper end thereof.

A connecting support member 32 is attached to the upper portion of the fixed support 27 to engage with an elongated opening provided on the side of the fixed support 27, and a cylinder holder 33 is fixed to the upper end of the connecting support member 32 to hold the upper end of a lifting cylinder 30. The lower portion of the lifting cylinder 30 is fixed to the base table 26. The lifting cylinder 30 is accompanied with a piston rod 34 inserted thereinto. The upper end of the piston rod 34 is connected through a coupling member 36 with the end plate 31 and a base plate 35 is fixed on the end plate 31. In addition, a position sensor 19 is attached to the connecting support member 32 to face the moving support 29, as shown in FIGS. 3 and 4.

With such a construction, when lifting cylinder 30 operates to move the piston rod 34 upward or downward, the moving support 29 is also moved upward or downward in accompany with the piston rod 34 and the moving distance of the moving support 29 is measured by the position sensor 19 so that the position of the base plate 35 is detected based on the detection output of the position sensor 19.

Figure 5:
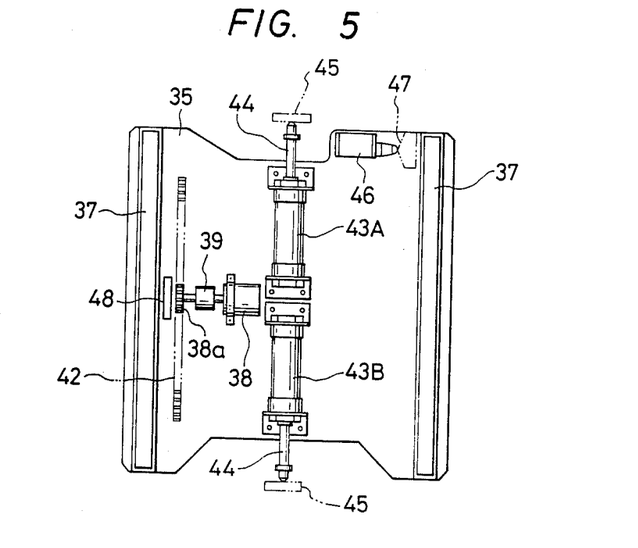
FIG. 5 is a schematic plane view of a base plate included in the lifter shown in FIG. 3.

As shown in FIG. 5, the base plate 35 is provided on its upper surface with a pair of parallel guide bars 37, and each two of four guide receivers 41 fixed on the lower surface of a first sliding plate 40, each of which is provided thereon with a groove, engage with each of the guide bars 37 to be slidable, as shown in FIG. 3. Further, a pulse motor 38 is fixed on the upper surface of the base plate 35 for moving the first sliding plate 40 in relation to the base-plate 35. The resolutions of the pulse motor 38 are transmitted through an electromagnetic clutch 39 to a pinior gear 38a which is meshed with a rack gear 42 fixed to the lower surface of the first sliding plate 40 and therefore the first sliding plate 40 is moved in the direction along the guide bars 37. For detecting the revolutions of the pinion gear 38a, a rotation sensor 48 is provided to face the pinion gear 38a.

The electromagnetic clutch 39 is controlled by control signal supplied from a control device, which will be described later, to couple the driving shaft of the pulse motor 38 with the pinion gear 38a or to disconnect the driving shaft of the pulse motor 38 from the pinion gear 38a so as to permit the first sliding plate 40 to be moved freely in the direction along the guide bars 37. Accordingly, the electromagnetic clutch 39 serves as a part of a releasing device for permitting the rotary mounting table 64 to move freely in the direction along the upper surface thereof.

The base plate 35 is further provided on its upper surface with a pair of cylinders 43A and 43B aligned in parallel with the guide bars 37 and used for indexing a reference position of the first sliding plate 40 in relation to the base plate 35, and the first sliding plate 40 is provided with a pair of stoppers 45 disposed on its lower surface so that abutments of piston rods 44 of the cylinders 43A and 43B run against the stoppers 45, respectively, when each of the piston rods 44 stretches. The reference position of the first sliding plate 40 is indexed by means of stretching each of the piston rods 44 of the cylinders 43A and 43B to cause the abutment thereof to run into the stopper 45 corresponding thereto prior to the weighty object mounting operation. The indexing of the reference position of the first sliding plate 40 is confirmed with the engagement of a limit switch 46 mounted on the upper surface of the base plate 35 with a limit guide 47 fixed to the lower surface of the first sliding plate 40. The limit switch 46 is turned on with such engagement.

Figure 6:
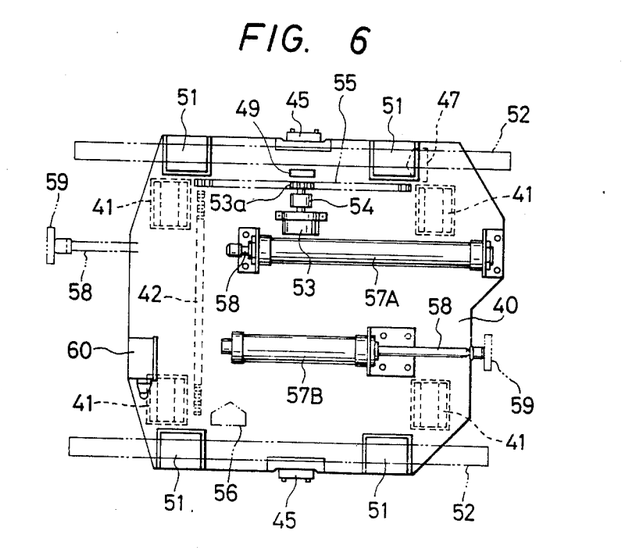
FIG. 6 is a schematic plane view of a first sliding plate included in the lifter snown in FIG. 3.

As shown in FIG. 6, the first sliding plate 40 is provided on its upper surface with four guide receivers 51 each having a groove extending to be perpendicular to the guide bars 37, and each of a pair of parallel guide bars 52 fixed to the lower surface of a second sliding plate 50 and elongating perpendicularly to the guide bars 37 engages with each two of the guide receivers 51 to be slidable, as shown in FIG. 3. Further a pulse motor 53 is fixed on the upper surface of the first sliding plate 40 for moving the second sliding plate 50 in relation to the first sliding plate 40. The revolutions of the pulse motor 53 are transmitted through an electromagnetic clutch 54 to a pinion gear 53a which is meshed with a rack gear 55 fixed to the lower surface of the second sliding plate 50 and therefore the second sliding plate 50 is moved in the direction along the guide bars 52. For detecting the revolutions of the pinion gear 53a, a rotation sensor 49 is provided to face the pinion gear 53a.

The electromagnetic clutch 54 is also controlled by the control signal supplied from the control device to couple the driving shaft of the pulse mirror 53 with the pinion gear 53a or to disconnect the driving shaft of the pulse motor 53 from the pinion gear 53a so as to permit the second sliding plate 50 to be moved freely in the direction along the guide bars 52. Accordingly, the electromagnetic clutch 54 also serves as another part of the releasing device for permitting the rotary mounting table 64 to move freely in the direction along the upper surface thereof.

The first sliding plate 40 is further provided on its upper surface with a pair of cylinders 57A and 57B arranged in parallel with each other and also with the guide bars 52 and used for indexing a reference position of the second sliding plate 50 in relation to the first sliding plate 40, and the second sliding plate 50 is provided with a pair of stoppers 59 disposed on its lower surface so that abutments of piston rods 58 of the cylinders 57A and 57B run against the stoppers 59, respectively, when each of the piston rods 58 stretches. The reference position of the second sliding plate 50 is indexed by means of stretching each of the piston rods 58 of the cylinders 57A and 57B to cause the abutment thereof to run into the stopper 59 corresponding thereto prior to the weighty object mounting operation. The indexing of the reference position of the second sliding plate 50 is confirmed with the engagement of a line switch 60 mounted on the upper surface of the first sliding plate 40 with a limit guide 56 fixed to the lower surface of the second sliding plate 50. The limit switch 60 is turned on with such engagement.

Figure 7:
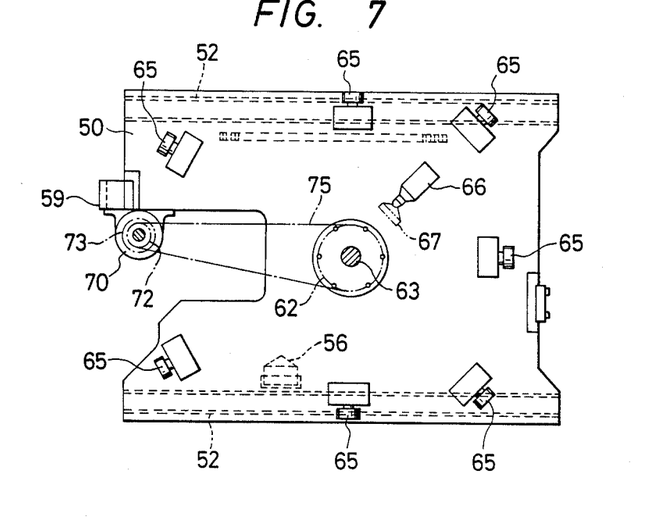
FIG. 7 is a schematic plane view of a second sliding plate included in the lifter shown in FIG. 3.

As shown in FIG. 3, the rotary mounting table 64 is disposed above the second sliding plate 50 to face the same. This rotary mounting table 64 is provided at the central portion of its lower surfce with a bearing 61 which engages with a rotary shaft 63 projecting upward from the central portion of the second sliding plate 50, and as shown in FIG. 7, the second sliding plate 50 is provided on its upper surface with seven supporting rollers 65 each of which engages with the lower surface of the rotary mounting table 64. With the engagement of the bearing 61 with the rotary shaft 63 and the engagement of each of the supporting rollers 65 with the lower surface of the rotary mounting table 64, the rotary mounting table 64 is supported to be rotatable on the second sliding plate 50.

A relatively large pulley 62 is attached to the bearing 61 of the rotary mounting table 64 and a relatively small pulley 72 is coupled with the driving shaft of a pulse motor 70 mounted on the second sliding plate 50. In addition, a belt 75 is engaged with both the relatively large pulley 62 and the relatively small pulley 72 to pass around them. Thus, the rotary mounting table 64 can be rotated about the rotary shaft 63 by a rotatory force transmitted thereto through the belt 75 from the driving shaft of the pulse motor 70. Further, a clutch 73 is interposed between the driving shaft of the pulse motor 70 and the relatively small pulley 72, so that the rotary mounting table 64 is disconnected from the driving shaft of the pulse motor 70 to be rotated freely when the clutch 73 is in disengagement.

A reference position of the rotary mounting table 64 in relation to the second sliding plate 50 is confirmed with the engagement of a limit switch 66 mounted on the upper surface of the second sliding plate 50 as shown in FIG. 7, with a limit guide 67 provided on the lower surface of the rotary mounting table 64. The limit switch 66 is turned on with such engagement.

Referring back to the FIG. 3, a positioning device 81 is attached to the rotary mounting table 64 for positioning the engine unit 17 on the rotary mounting table 64 appropriately in relation to the mounting position provided on the vehicle body 14. The positioning device 81 has a rod member 81a coupled through a bracket 83 with a cylinder 82 which is fixed to the side portion of the rotary mounting table 64 and a tapered member 81b disposed at the upper end of the rod member 81a for engaging with the vehicle body 14. Besides, a contact sensor 85 which is inserted into a tubular support 84 fixed to the rod member 81a so as to be supported thereby through a coil spring contained in the tubular support 84 is provided for detecting the engagement of tapered member 81b of the positioning device 81 with the vehicle body 14. The contact sensor 85 is so arranged that an aboutment at the upper end thereof is positioned to be slightly lower than the top of the tapered member 81b of the positioning device 81.

Furthermore, as shown in FIG. 2, the mounting robots 80a and 80b are installed in the vicinity of the front lifter 20 for mounting the engine unit 17 on the mounting position provided on the vehicle body 14. Since each of the mounting robots 80a and 80b is of the same construction, only the mounting robot 80b will be explained and the explanation of the mounting robot 80a will be omitted.

As shown clearly in FIG. 3, the mounting robot 80b has a first arm 92 connecting to be movable laterally with a support member 91 which is connected to be movable vertically with a fixed guide member 90 and a second arm 93 coupled to be movable laterally with the first arm 92, and a nut-runner 77 is attached to the end portion of the second arm 93.

In the front lifter 20 constructed as described above, the first sliding plate 40 is driven by the pulse motor 38 to move in relation to the base plate 35, which is fixed on the end plate 31 secured at the upper end of the moving support 29, in a direction perpendicular to the direction of transportation of the vehicle body 14 into the mounting station STp and the second sliding plate 50 is driven by the pulse motor 53 to move in relation to the first sliding plate 40 in a direction along the direction of transportation of the vehicle body 14 into the mounting station STp, so that the rotary mounting table 64 provided above the second sliding plate 50 is moved in relation to the moving support 29 in both the direction perpendicular to the direction of transportation of the vehicle body 14 into the mounting station STp and the direction along the direction of transportation of the vehicle body 14 into the mounting station STp. Further, the rotary mounting plate 64 is driven by the pulse motor 70 to rotate in relation to the fixed support 27, and moved upward and downward in accompany with the moving support 29 which is driven by the lifting cylinder 30 to ascend and descend in relation to the fixed support 27. Accordingly, a position adjusting device for shifting the position of the upper surface of the rotary mounting table 64 is constituted with the first sliding plate 40, the second sliding plate 50, the pulse motors 38, 53 and 70, and so on.

As aforementioned, the rear lifter 21 is constructed in the same manner as the front lifter 20 and the rotary mounting table 64 thereof is also moved in relation to a fixed support 27 thereof in the direction perpendicular to the direction of transportation of the vehicle body 14 into the mounting station STp and the direction along the direction of transportation of the vehicle body 14 into the mounting station STp, driven to rotate in relation to the fixed support 27, and moved upward and downward in relation to the fixed support 27.

Incidentally, although the positioning device 81 attached to the rotary mounting table 64 of the front lifter 20 and the mounting robots 80a and 80b installed in the vicinity of the front lifter 20 are arranged to be suitable for the engine unit 17, a positioning device 81 attached to the rotary mounting table 64 of the rear lifter 21 and the mounting robots 80c and 80d installed in the vicinity of the rear lifter 21 are arranged to be fit for the rear axle unit 18.

In connection with the front and rear lifters 20 and 21 and the mounting robots 80a, 80b, 80c and 80d thus constituted, the control device is provided for controlling the sequential operation of each of the combination of the front lifter 20 and the mounting robots 80a and 80b and the combination of the rear lifter 21 and the mounting robots 80c and 80d. Since each of such combinations is controlled in its operation in substantially the same manner, only the operation of the combination of the front lifter 20 and the mounting robots 80a and 80b will be described hereinafter and the description of the operation of the combination of the rear lifter 21 and the mounting robots 80c and 80d will be omitted.

Figure 8:
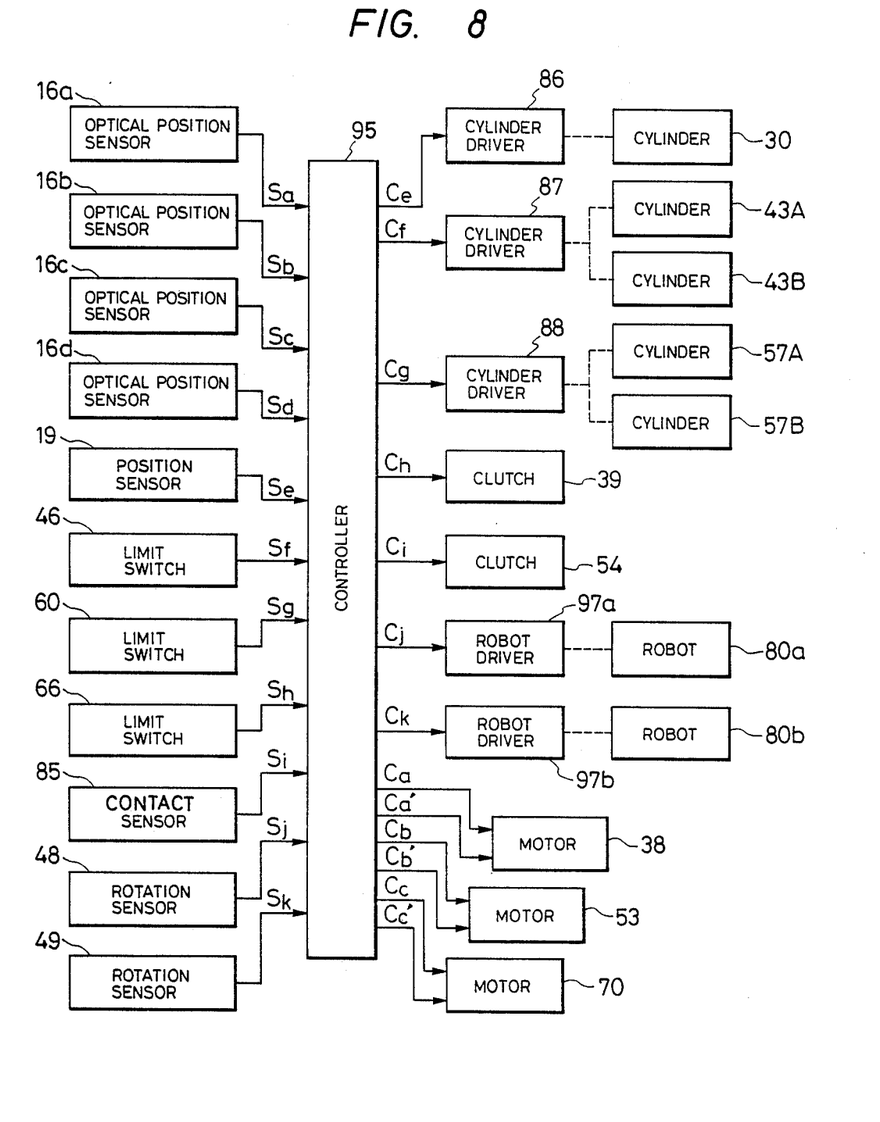
FIG. 8 is a block diagram showing a control system used in the embodiment shown in FIG. 1.

As shown in FIG. 8, a controller 95 is provided for controlling the operation of the lifting cylinder 30, the cylinders 43A and 43B for indexing the reference position of the first sliding plate 40 in relation to the base plate 35, the cylinders 57A and 57B for indexing the reference position of the second sliding plate 50 in relation to the second sliding plate 50, the pulse motors 38, 53 and 70 for moving respectively the first sliding plate 40, the second sliding plate 50 and the rotary mounting table 64, the electromagnetic clutches 39 and 54 provided respectively for the pulse motors 38 and 53, and the mounting robots 80a and 80b. To the controller 95, detection output signals Sa, Sb, Sc and Sd obtained respectively from the optical position sensors 16a, 16b, 16c and 16d provided in the positioning station STs, a detection output signal Se obtained from the position sensor 19 and representing the position of the rotary mounting table 64, and reference position signals Sf, Sg and Sh derived respectively from the limit switchs 46, 60 and 66 are supplied. The reference position signal Sf is obtained when the first sliding plate 40 is located at the reference position in relation to the base plate 35 and therefore the limit switch 46 is in the ON state. Similarly, the reference position signal Sg is obtained when the second sliding plate 50 is located at the reference position in relation to the first sliding plate 40 and therefore the limit switch 60 is in the ON state. Further, the reference position signal Sh is obtained when the rotary mounting plate 64 is located at the reference position in relation to the second sliding plate 50 and therefore the limit switch 66 is in the ON state.

In addition, a detection output signal Si which is obtained from the contact sensor 85 when the tapered member 81b of the positioning device 81 engages with a receiving portion provided on the vehicle body 14, and detection output signals Sj and Sk obtained respectively from the rotation sensors 48 and 49 are also supplied to the controller 95. The detection output signal Sj represents the moving distance of the first sliding plate 40 calculated based on the revolutions of the pinion gear 38a and the detection output signal Sk represents the moving distance of the second sliding plate 50 calculated based on the revolutions of the pinion gear 53a.

The controller 95 is operative to supply the pulse motors 38, 53 and 70 with driving signals Ca, Cb and Cc for normal revolutions or driving signals Ca', Cb' and Cc' for reverse revolutions, respectively, also to supply a cylinder driver 86 provided for driving the lifting cylinder 30, a cylinder driver 87 provided for driving the cylinders 43A and 43B, and a cylinder driver 88 provided for driving the cylinders 57A and 57B with control signals Ce, Cf and Cg, respectively, and further to supply the electromagnetic clutches 39 and 54 and robot drivers 97a and 97b provided respectively for driving the mounting robots 80a and 80b with control signals Ch, Ci, Cj and Ck, respectively, in response to the signals supplier thereto as mentioned above. When the driving signal Ca or Ca' is supplied to the pulse motor 38 from the controller 95, the pulse motor 38 comes into normal or reverse revolutions so as to move the first sliding plate 40 on the base plate 35 in the direction perpendicular to the direction of transportation of the vehicle body 14 into the mounting station STp, and when the driving signal Cb or Cb' is supplied to the pulse motor 53 from the controller 95, the pulse motor 53 comes into normal or reverse revolutions so as to move the second sliding plate 50 on the first sliding plate 40 in the direction along the direction of transportation of the vehicle body 14 into the mounting station STp. Further, when the driving signal Cc or Cc' is supplied to the pulse motor 70 from the controller 95, the pulse motor 70 comes into normal or reverse revolutions so as to rotate the rotary mounting table 64 above the second sliding plate 50 clockwise or counterclockwise.

With such configurations of the respective portions as mentioned above, when the vehicle body 14 is transported into and stopped in the positioning station STs, the first sliding plate 40, the second sliding plate 50 and the rotary mounting table 64 are controlled to be located at the respective reference positions. On the occasion of such control operations, the control signals Cf and Cg are supplied from the controller 95 to the cylinder drivers 87 and 88, respectively, so that the cylinder drivers 87 and 88 drive respectively the cylinders 43A and 43B and the cylinders 57A and 57B to have the piston rods 44 and 58 stretch, and the driving signals Cc and Cc' are supplied from the controller 95 to the pulse motor 70, so that the pulse motor 70 has predetermined normal revolutions and reverse revolutions. With these operations of the cylinders 43A, 43B, 57A and 57B and the pulse motor 70, the first and second sliding plates 40 and 50 are moved into the reference position in relation to the base plate 35 and the reference position in relation to the first sliding plate 40, respectively, and the rotary mounting table 64 is revolved into the reference position in relation to the second sliding plate 50.

When the first and second sliding plates 40 and 50 and the rotary mounting table 64 have reached their respective reference positons, each of the limit switches 46, 60 and 66 is turned on and the reference position signals Sf, Sg and Sh are supplied to the controller 95. The controller 95 stops supplying the control signals Cf and Cg and the driving signals Cc and Cc' in response to the reference position signals Sf, Sg ard Sh, and therefore the first and second sliding plates 40 and 50 and the rotary mounting table 64 are kept to be at their respective reference positions.

Then, the engine unit 17 accompanied with the pallet 24 is placed on the rotary mounting table 64 and the position of each of the first and second sliding plates 40 and 50 and the rotary mounting table 64 located at their respective reference positions is adjusted in the following manner.

In the controller 95, first, an actual position of a reference hole for positional detection provided on the vehicle body 14 which transported into and stopped in the positioning station STs is detected based on the detection output signals Sa, Sb, Sc and Sd supplied from the optical position sensors 16a, 16b, 16c and 16d to the controller 95, and positional deviation of the actual position of the reterence hole thus detected from a reference position memorized in a memory contained in the controller 95 is calculated. Then, the driving signals Ca, Cb and Cc or Ca', Cb' and Cc' corresponding to the calculated positional deviation are produced and supplied respectively to the pulse motors 38, 53 and 70 from the controller 95. Each of the pulse motors 38, 53 and 70 rotates normally or reversely in response to each of the driving signals Ca, Cb and Cc or Ca', Cb' and Cc' and therefore the first sliding plate 40 is shifted in the direction perpendicular to the direction of transportation of the vehicle body 14 into the mounting station STp by a distance corresponding to the driving signal Ca or Ca', the second sliding plate 50 is shifted in the direction along the direction of transportation of the vehicle body 14 into the mounting station STp by a distance corresponding to the driving signal Cb or Cb', and the rotary mounting table 64 is rotated by a rotational angle corresponding to the driving signal Cc or Cc'. With these adjusting movements of the first and second sliding plates 40 and 50 and the rotary mounting table 64, the position of the engine unit 17 placed on the rotary mounting table 64 of the front lifter 20 in relation to the vehicle body 14 transported into and stopped in the mounting station STp is corrected to eliminate misalignments between the engine unit 17 and the vehicle body 14 on the mounting station STp.

After that, the controller 95 supplies the cylinder driver 86 with the control signal Ce, and therefore the piston rod 34 of the lifting cylinder 30 is stretched upward by the cylinder driver 86. As a result, the moving support 29 accompanied with the base plate 35 ascends and the rotary mounting table 64 on which the engine unit 17 is placed is moved upward toward the vehicle body 14. During such upward movement of the rotary mounting table 64, the controller 95 supplies also the pulse motors 38, 53 and 70 with the driving signals Ca, Cb and Cc or the driving signals Ca', Cb' and Cc', respectively, in accordance with a control program which is predetermined in conformity with the type of the vehicle body 14 and the type of the engine unit 17 and stored in the memory contained in tte controller 95 and to which the positions of the first and second sliding plates 40 and 50 and the rotary mounting table 64 corrected in the aforementioned manner and an actual vertical position of the rotary mounting table 64 detected based on the detection output signal Se are applied. The pulse motors 38, 53 and 70 are rotated to move further the first sliding plate 40, the second sliding plate 50 and the rotary mounting table 64 in accordance with the driving signals Ca, Cb and Cc or Ca', Cb' and Cc'. With these movements of the base plate 35, first and second sliding plates 40 and 50, and rotary mounting table 64, the engine unit 17 placed on the rotary mounting table 64 is lifted from a position indicated with a dot-dash line in FIG. 1 toward the vehicle body 14 along a moving path indicated with a cranked arrow R in FIG. 1 without interferring with various portions of the vehicle body 14. Then, when the upper end of the engine unit 17 is lifted by a distance L to reach to the height indicated with H as shown in FIG. 1, the engine unit 17 is moved into the mounting position provided on the vehicle body 14 as indicated with a double dots dash line in FIG. 1.

When the engine unit 17 placed on the rotary mounting table 64 is moved upward into the mounting position provided on the vehicle body 14 in such a manner as described above, the rotary mounting table 64 is subjected to a further positional correction.

Figure 9:
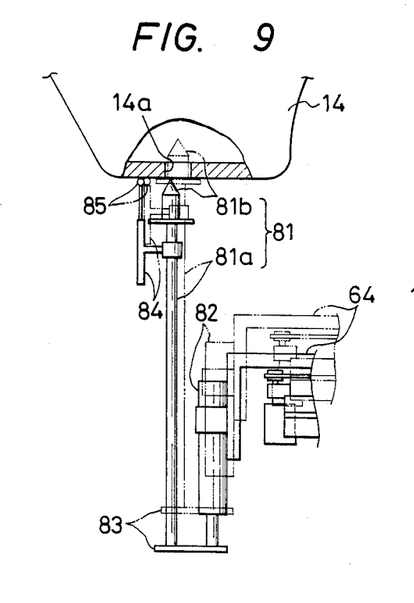
FIG. 9 is a schematic side view used for explaining the operation of a positioning device employed in the embodiment shown in FIG. 1.

In process of the upward movement of the rotary mounting table 64 toward the vehicle body 14, when the tapered member 81b of the positioning device 81 attached to the rotary mounting table 64 just enters into engagement with a reference hole 14a which is provided on the vehicle body 14 for serving as the receiving portion aforementioned, as shown in FIG. 9, the abutment at the upper end of the contact sensor 85 mixed to the positioning device 81 is pressed against the vehicle body 14. With such contact of the abutment with the vehicle body 14, the detection output signal Si is supplied from the contact sensor 85 to the controller 95, and the controller 95 supplies the electromagnetic clutches 39 and 54 with the control signals Ch and Ci respectively in response to the detection output signal Si so cause each of the electromagnetic clutches 39 and 54 to be in disengagement. Therefore, power transmitting paths to the pinion gear 38a from the pulse motor 38 and to the pinion gear 53a from the pulse motor 53 are broken, and the first and second sliding plates 40 and 50 are permitted to move freely in the direction perpendicular to the direction of transportation of the vehicle body 14 into the mounting station STp and in the direction along the direction of transportation of the vehicle body 14 into the mounting station STp, respectively. Consequently, the rotary mounting table 64 is caused to be able to move freely in the direction along the upper surface thereof.

Accordingly, under the situation wherein the abutment at the upper end of the contact sensor 85 is in contact with the vehicle body 14, the rotary mounting table 64 is lifted and simultaneously moved in the direction along the upper surface thereof in accordance with a condition of engagement between the tapered member 81b of the positioning device 81 and the reference hole 14a, as indicated with a double dots-dash line in FIG. 9, and as a result, the engine unit 17 placed on the rotary mounting table 64 is positioned to move exactly into the mounting position provided on the vehicle body 14.

During the upward movement of the rotary mounting table 64 caused by the lifting cylinder 30 in the above mentioned manner, the detection output signal Sj representing the moving distance of the first sliding plate 40 and the detection output signal Sk representing the moving distance of the second sliding plate 50 are supplied to the controller 95 from the rotation sensor 48 disposed to face the pinion gear 38a and the rotation ensor 49 disposed to face the pinion gear 53a, respectively. The controller 95 operates to obtain positional information of both the position of the first sliding table 40 and the position of the second sliding table 50 based on the detection output signals Sj and Sk supplied thereto at an instant at which the upward movement of the rotary mounting table 64 is terminated, and supplies the robot drivers 97a and 97b with the control signals Cj and Ck so as to control the working position of each of the nut-runners 77 attached to the mounting robots 80a and 80b in accordance with the obtained positional information. The mounting robots 80a and 80b are driven to ascend to such respective positions as indicated with a double dots-dash line in connection with the mounting robot 80b in FIG. 1 and then to move the nut-runners 77 into their respective proper working positions by the robot drivers 97a and 97b in response to the control signals Cj and Ck, respectively. After that, the engine unit 17 is fixed to the vehicle body 14 through the operation of each of the nut-runners 77.

In the case of the combination of the rear lifter 21 and the mounting robots 80c and 80d, the rear lifter 21 operates in the similar manner as the front lifter 20 and the rear axle unit 18 placed on the rotary mounting table 64 of the rear lifter 21 is lifted to moved into a mounting position provided on the vehicle body 14 as indicated with a double dots-dash line in FIG. 1.

In process of lifting of the rear axle unit 18, a tapered member 81b of a positioning device 81 attached to the rotary mounting table 64 of the rear lifter 21 comes into engagement with a receiving portion provided on the vehicle body 14, and thereby the rear axle unit 18 placed on the rotary mounting table 64 of the rear lifter 21 is also positioned to move exactly into the mounting position provided on the vehicle body 14. Then, the rear axle unit 18 is fixed to the vehicle body 14 through the operation of each of nut runners 77 attached to the mounting robots 80c and 80d, respectively.

In such a manner as described above, during the upward movement of the rotary mounting table 64 caused by the lifting cylinder 30, the rotary mounting table 64 is moved in the direction along the uppper surface thereof in accordance with a condition of engagement between the tapered member 81b of the positioning device 81 and the receiving portion such as the reference hole 14a, so that the engine unit 17 or the rear axle unit 18 placed on the rotary mounting table 64 is positioned to be engaged properly with the mounting position provided on the vehicle body 14. Accordingly, even though the vehicle body 14 transported into and stopped in the mounting station STp is accompanied with minute positional deviations from the position detected at the positioning station STs, each of the engine unit 17 and the rear axle unit 18 is adjusted in its position to compensate substantially for such positional deviations and therefore, engaged properly with the vehicle body 14 at the mounting position thereon so as to be attached correctly to the same.

Although the nut-runners 77 are attached to the mounting robots 80a, 80b, 80c and 80d in the embodiment described above, it is to be understood that the nut-runners 77 can be attached directly to the rotary mounting tables 64 of the front and rear lifters 20 and 21.

Figure 10:
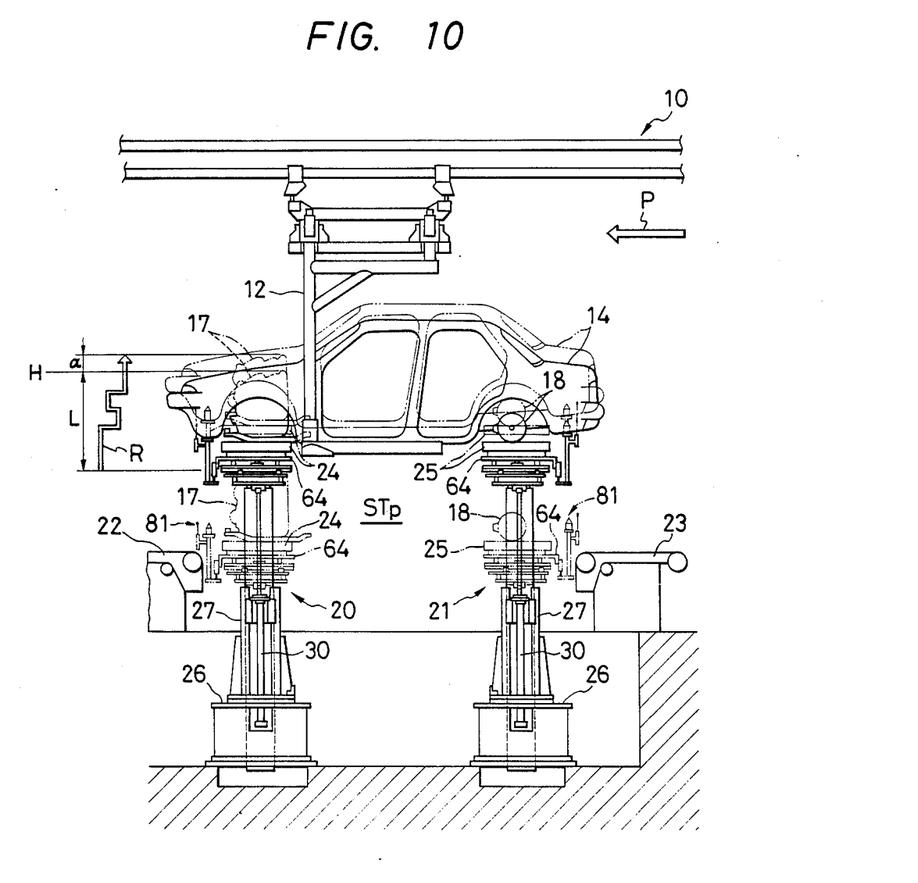
FIG. 10 is a schematic side view showing another embodiment of weighty object mounting system according to the present invention.

FIG. 10 shows schematically another example of the weighty object mounting system according to the present invention. This example is also applied for mounting an engine unit and a rear axle unit of a vehicle body in a vehicle assembly line, and in FIG. 10, parts, portions and arrangements corresponding to those of FIG. 1 are marked with the same references and further detailed description thereof will be omitted.

In the example of FIG. 10, after an engine unit 17 placed on a rotary mounting table 64 of a front lifter 20 has been lifted by a lifting cylinder 30 from the position indicated with a double dots-dash line in FIG. 10 by a distance L to be moved into a mounting position provided on a vehicle body 14 supported by a hanger 12 with its upper end reaching to the height indicated with H in a mounting station STp, as indicated with solid and broken lines in FIG. 10, a controller which is provided in the same manner as the controller 95 provided in the example of FIG. 1 supplies a cylinder driver for driving the lifting cylinder 30 with an additional control signal for operating the cylinder driver and thereby the lifting cylinder 30 causes the rotary mounting table 64 to move upward further so that the engine unit 17 is further lifted by a short distance α as indicated with a dot-dash line in FIG. 1 and then to stop ascending. With such additional lift of the engine unit 17, the vehicle body 14 is pushed up by the engine unit 17 to be lifted out of the hanger 12, as indicated with a double dots-dash line in FIG. 10.

Simultaneously with this, a rear lifter 21 having a rotary mounting table 64 on which a rear axle unit 18 is placed operates in the similar manner as the front lifter 20, so that the rear axle unit 18 placed on the rotary mounting table 64 is first lifted by a lifting cylinder 30 from the position indicated with a double dots-dash line in FIG. 10 by a distance L to be moved into a mounting position provided on the vehicle body 14, as indicated with a solid line in FIG. 10, and then further lifted by a short distance α as indicated with a dot-dash line in FIG. 1. With such additional lift of the rear axle unit 18, the vehicle body 14 is pushed up also by the rear axle unit 18 to be lifted of the hannger 12, as indicated with a double dots-dash line in FIG. 10.

After that, the engine unit 17 and the rear axle unit 18 are fixed to the vehicle body 14 through the operation of a plurality of nut-runners attached to mounting robots (not shown in FIG. 10) corresponding to the mounting robots 80a, 80b, 80c and 80d employed in the example of FIG. 1.

In this example, the vehicle body 14 which is lifted out of the hanger 12 is supported substantially by the front and rear lifters 20 and 21 horizontally without being inclined. Consequently, even though the vehicle body 14 transported into and stopped in the mounting station STp is accompanied with a positional error in the direction of ascent and descent of the rotary mounting table 64 or positional errors resulting from being inclined to the hanger 12, in addition to minute positional deviations from the position detected at the positioning station STs, each of the engine unit 17 and the rear axle unit 18 is adjusted in its position to compensate substantially for not only the minute positional deviations but also such positional errors and therefore engaged properly with the vehicle body 14 at the mounting position thereon so as to be attached correctly to the same.

Figure 11:
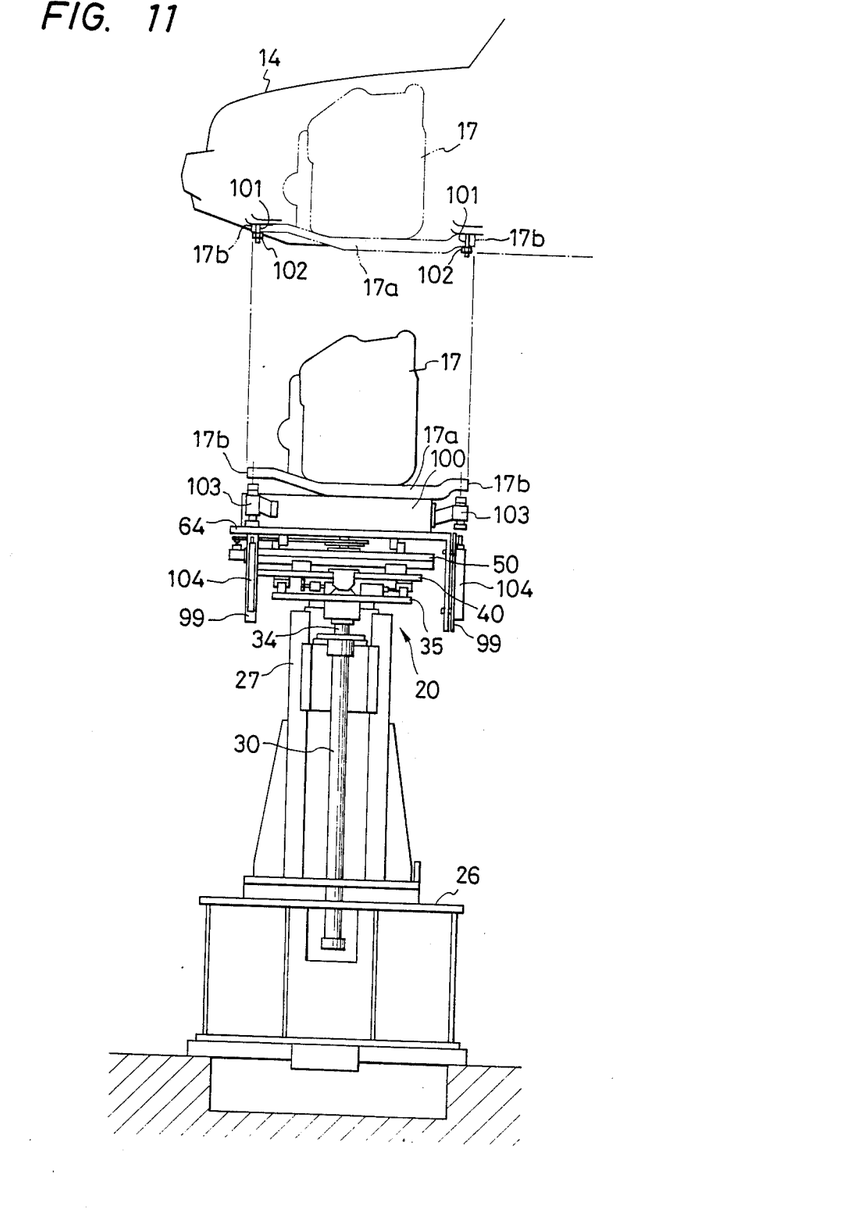
FIG. 11 is a schematic side view showing a part of a further embodiment of weighty object mounting system according to the present invention.

FIG. 11 shows schematically a part of a further example of the weighty object mounting system according to the present invention. This example also has a couple of lifters used for mounting an engine unit and a rear axle unit on a vehicle body in a vehicle assembly line and only a front lifter 20 provided in a mounting station is shown in FIG. 11. In FIG. 11 also, parts, portions and arrangements corresponding to those of FIG. 3 in which the front lifter 20 employed in the example of FIG. 1 is shown are marked with the same references and further detailed description thereof will be omitted.

Referring to FIG. 11, the front lifter 20 having a rotary mounting table 64 is provided with a pallet 100 which is disposed on the rotary mounting table 64 to be positioned at a predetermined location on the same, and an engine unit 17 which is provided with a base member 17a attached thereto is placed on the pallet 100 to be positioned at a predetermined location on the same. Accordingly, the engine unit 17 on the pallet 100 is positioned in relation to the rotary mounting table 64.

The base member 17a of the engine unit 17 has engaging end portions 17b so arranged as to correspond to mounting portions each of which is provided on a vehicle body 14 transported into and stopped in the mounting station and has a connecting bolt 101. Each of the engaging end portions 17b of the base member 17a is provided with a hole or cutout for causing the connecting bolt 101 to pass therethrough and is engaged with each of the mounting portions on the vehicle body 14 when the engine unit 17 is lifted by the front lifter 20 to move into the vehicle body 14 to be mounted thereon. The engaging end portions 17b of the base member 17a engaged with the respective mounting portions on the vehicle body 14 are fixed thereto with a plurality of nuts 102 engaged with the respective connecting bolts 101 each passing through the hole or cutout at the engaging end portion 17b to be tightened to the same, as shown with a double dots-dash line in FIG. 11.

The pallet 100 is provided with a plurality of nut-runners 103 each of which is positioned at a location corresponding to each of the engaging end portions 17b of the base member 17a attached to the engine unit 17 on the pallet 100. Further, a plurality of nut-runner drivers 104 are attached through supporting plate members 99 to the rotary mounting table 64. Each of the nut-runner drivers 104 is arranged to be able to move upward and downward in relation to the rotary mounting table 64 so as to be engaged with and disengaged from corresponding one of the nut-runners 103.

Figure 12:
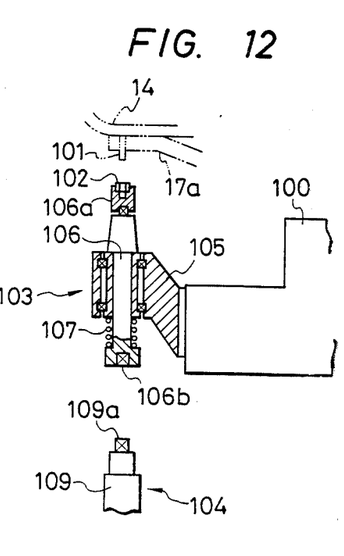
FIG. 12 is a schematic illustration showing a nut-runner driver provided in the part of the further embodiment shown in FIG. 11.

As shown in FIG. 12 the nut-runner 103 comprises a shaft member 106 which is supported to be able to move upward and downward and further to be rotatable by a bracket 105 attached to the side portion of the pallet 100, and a coil spring 107 for forcing the shaft member 106 to intend to move downward in relation to the bracket 105. A socket portion 106a for supporting the nut 102 is provided at the upper end of the shaft member 106 and a coupling portion 106b is provided at the lower end of the shaft member 106. Further, the nut-runner driver 104 comprises a motor 109 and an engaging shaft member 109a coupled with the motor 109 to be driven thereby and having an end portion thereof shaped for engaging with the coupling portion 106b of the nut runner 103.

With the configuration thus constituted, the front lifter 20 is moved upward and downward in the same manner as that in the embodiment of FIG. 1 or the embodiment of FIG. 10. When the engine unit 17 placed on the pallet 100 which is positioned at the predetermined location on the rotary mounting table 64 of the front lifter 20 has been lifted by the front lifter 200 to be moved into the vehicle body 14 and thereby the engaging end portions 17b of the base member 17a of the engine unit 17 has been engaged with the mounting portions on the vehicle body 14, each of the nut-runner drivers 104 is moved in relation to the rotary mounting table 64 so that the end portion of the engaging shaft member 109a is engaged with the coupling portion 106b of the corresponding nut runner 103, the socket portion 106a of which holds the nut 102. After that, each of the nut-runner drivers 104 is further moved upward to push up the nut-runner 103 engaging therewith toward the engine unit 17 positioned in the vehicle body 14 and thereby the nut 102 held by the socket portion 106a of the nut-runner 103 comes into contact with the end portion of the connecting bolt 101 which projects downward from the mounting portion on the vehicle body 14 to pass through the hole or cutout at the engaging end portion 17b of the base member 17a of the engine unit 17. Then, the motor 109 of each of the nut-runner drivers 104 is revolved to drive the engaging shaft member 109a and thereby the socket portion 106a provided at the upper end of the shaft member 106 of the nut-runner 103 which engages with the engaging shaft member 109a is revolved, so that the nut 102 held by the socket portion 106a is revolved to be tightened to the connecting bolt 101. Consequently, the engaging end portions 17b of the base member 17a of the engine unit 17 are fixed to the respective mounting portions on the vehicle body 14 and the engine unit 17 is mounted on the vehicle body 14.

What is claimed is:

1. A weighty object mounting systen for use in an assembly line comprising;
    mounting table means provided in a mounting station established in the assembly line for supporting a weighty object placed thereon to be mounted on a transportable object which is held by a movable support member and transported into the mounting station,
    lifting means for causing said mounting table means to ascend for moving the weighty object placed thereon upward into a mounting position provided on the transportable object,
    position adjusting means for shifting the position of said mounting table means so as to compensate for misalignments arising between the transportable object and the weighty object in the mounting station,
    mounting table releasing means provided in relation to said position adjusting means and operative to cause said position adjusting means to make said mounting table means movable in a plane along the direction of transportation of the transportable object into the mounting station,
    positioning means attached to said mounting table means and having a tapered portion for engaging with a receiving portion provided on the transportable object when said mounting table means ascends,
    sensing means for detecting such a condition that the tapered portion of said positioning device comes into engagement with the receiving portion of the transportable object, and
    control means operative to cause said mounting table releasing means to operate in response to a detection output from said sensing means.

2. A weighty object mounting system according to claim 1, wherein said mounting table means comprises a first slidable member operative to move forward and backward in relation to the transportable object in the mounting station and a second slidable member operative to move right and left in relation to the transportable object in the mounting station.

3. A weighty object mounting system according to claim 2, wherein said mounting table means further comprises a rotary member operative to rotate about an axis elongating up and down.

4. A weighty object mounting system according to claim 2, wherein said mounting table releasing means is engaged with said first and second slidable members for permitting each of said first and second slidable members to move independently forward and backward in relation to the transportable object and right and left in relation to the transportable object in the mounting station, respectively.

5. A weighty object mounting system according to claim 4, wherein said control means is operative further for causing said lifting means to lift said mounting table means by a predetermined distance after the detection output from said sensing means is obtained and then to prevent said mounting table releasing means from operating.

6. A weighty object mounting system according to claim 1, wherein said position adjusting means comprises an optical position sensor provided for detecting a stop position of the transportable object in a positioning station established to be adjacent to the mounting station at the upper course of the assembly line, positional error detecting means for obtaining errors in position of the transportable object in the mounting station based on a detection output of said optical position sensor, and adjusting means for adjusting the position of said mounting table means in response to the errors in position obtained by said positional error detecting means.

7. A weighty object mounting system according to claim 1, wherein said control means is operative further to cause said lifting means to lift additionally said mounting table means by a predetermined distance after the weighty object placed on said mountng table means is moved into the mounting position provided on the transportable object.

8. A weighty object mounting system according to claim 1, wherein said mounting table means comprises a table top member for supporting a pallet positioned thereon, said pallet being provided with the weighty object positioned thereon and provided also with fixing means attached thereto for use in fixing the weighty object to the transportable object in the mounting station, and driving means attached to said table top member for engaging with said fixing means to drive the same.

* * * * *